United States Patent
Jean et al.

(10) Patent No.: US 10,523,958 B1
(45) Date of Patent: *Dec. 31, 2019

(54) PARALLEL COMPRESSION OF IMAGE DATA IN A COMPRESSION DEVICE

(71) Applicant: Matrox Graphics Inc., Dorval (CA)

(72) Inventors: Nicolas Jean, Dorval (CA); Mathieu Girard, Dorval (CA); Jean-Jacques Ostiguy, Dorval (CA)

(73) Assignee: MATROX GRAPHICS INC., Dorval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,625

(22) Filed: Dec. 20, 2018

Related U.S. Application Data

(63) Continuation of application No. 15/140,380, filed on Apr. 27, 2016, now Pat. No. 10,171,825.

(51) Int. Cl.

| | |
|---|---|
| *H04N 19/436* | (2014.01) |
| *H04N 19/12* | (2014.01) |
| *H04N 19/172* | (2014.01) |
| *H04N 19/146* | (2014.01) |
| *H04N 19/196* | (2014.01) |
| *H04N 19/80* | (2014.01) |

(52) U.S. Cl.
CPC ........... *H04N 19/436* (2014.11); *H04N 19/12* (2014.11); *H04N 19/146* (2014.11); *H04N 19/172* (2014.11); *H04N 19/196* (2014.11); *H04N 19/80* (2014.11)

(58) Field of Classification Search
None
See application file for complete search history.

(56) References Cited

U.S. PATENT DOCUMENTS

| | | |
|---|---|---|
| 6,343,098 B1 | 1/2002 | Boyce |
| 6,859,496 B1 | 2/2005 | Boroczky et al. |
| 8,780,973 B2 | 7/2014 | Srinivasamurthy et al. |
| 9,047,669 B1 | 6/2015 | Ostiguy et al. |
| 9,445,110 B2 | 9/2016 | Leontaris et al. |
| 10,171,825 B1 * | 1/2019 | Jean ..................... H04N 19/436 |
| 2012/0140816 A1 | 6/2012 | Franche et al. |

(Continued)

OTHER PUBLICATIONS

Aboalmaaly M. F., et al., "Data-Level Parallel Approaches for the H.264 Coding: A Review," First International Engineering Conference (IEC2014), 2014, pp. 221-228.

(Continued)

*Primary Examiner* — Christopher G Findley
(74) *Attorney, Agent, or Firm* — Nicholson De Vos Webster & Elliott LLP

(57) ABSTRACT

Method and apparatus of compressing a stream of pictures in parallel in a compression device, where the compression device includes at least a first and a second component, are described. A first portion of a first picture of a stream of pictures is processed in the first component of the compression device, while a second portion of a second picture of the stream of pictures is simultaneously processed in the second component of the compression device according to partial compression statistics associated with the second picture, where the partial compression statistics result from the processing of the second picture in the compression device when compression of the second picture is not yet completed.

40 Claims, 9 Drawing Sheets

(56) References Cited

U.S. PATENT DOCUMENTS

| | | |
|---|---|---|
| 2013/0287299 A1 | 10/2013 | Huang et al. |
| 2014/0153644 A1 | 6/2014 | Dzik |
| 2014/0185664 A1 | 7/2014 | Van Der Auwera et al. |
| 2015/0304667 A1 | 10/2015 | Suehring et al. |
| 2015/0341657 A1 | 11/2015 | Onno et al. |

OTHER PUBLICATIONS

Bhattacharyya S., et al., "Burstiness Minimized Rate Control for High Resolution H.264 Video Conferencing," IEEE, 2014, 6 pages.

Bhattacharyya S., et al., "Burstiness Minimized Rate Control for High Resolution H.264 Video Conferencing," IEEE Abstract, Communications (NCC), 2014 Twentieth National Conference on Feb. 28, 2014-Mar. 2, 2014, IEEE, [retrieved on Aug. 4, 2015] Retrieved from the Internet: 2 pages.

Gu, Junli, et al., "Optimizing a Parallel Video Encoder with Message Passing and a Shared Memory Architecture," Tsinghua Science and Technology, vol. 16, No. 4, Aug. 2011, pp. 393-398.

Meenderinck C., et al., "Parallel Scalability of Video Decoders," Journal of Signal Processing Systems, 2008, 22 pages.

Non-Final Office Action from U.S. Appl. No. 15/140,380, dated Jan. 19, 2018, 15 pages.

Notice of Allowance from U.S. Appl. No. 15/140,380, dated Aug. 27, 2018, 8 pages.

Sharma H., "Comparative Performance of JM and FFMPEG Codecs of H.264 AVC Video Compression Standard," A Thesis Presented to the Faculty of San Diego State University, 2012, 73 pages.

Wang Y., et al., "Multi-Grain Parallel Accelerate System for H.264 Encoder on ULTRASPARC T2," Journal of Computers, Dec. 2013, vol. 8 (12), pp. 3293-3297.

Yoo K., et al., "Pipelining Architecture Design of the H.264/AVC HP@L4.2 Codec for HD Applications," Picture Coding Symposium 2007, Nov. 7-9, 2007, 4 pages.

* cited by examiner

PARALLEL COMPRESSION OF IMAGE DATA IN A COMPRESSION DEVICE

CROSS-REFERENCE TO RELATED APPLICATIONS

This application is a continuation of application Ser. No. 15/140,380, filed Apr. 27, 2016, which is hereby incorporated by reference.

FIELD

Embodiments of the invention relate to the field of image data compression and decompression; and more specifically, to the parallel compression of image data in a compression device.

BACKGROUND

Applications that use image data are found in many different fields, such as security control, television, broadcasting, social media, video telephony, videoconferencing, wireless devices, streaming media applications, remote desktop, cloud computing, and others. Image data may refer to video data, computer generated graphics data, desktop data, or any other type of data depicting a visual perception. Image data may be stored in a variety of medium (DVDs, Blu-Ray disks, mobile devices, memory sticks, hard-drive, etc.) and may be transmitted through a variety of wired or wireless transmission media (also called a carrier) (e.g., electrical, optical, radio, acoustical or other form of propagated signals—such as carrier waves, infrared signals etc.).

Image compression and decompression are performed to reduce the consumption of expensive resources, such as storage space or transmission bandwidth. In general, a codec (encoder/decoder) includes an encoder used to convert the source image data into a compressed form occupying a reduced space prior to storage or transmission. The codec may also comprise a decoder which receives compressed data and converts it into a decompressed image or stream ready for display or for further processing. The codec may be implemented only in software executed on one or more general purpose processors, implemented only on dedicated hardware components, or a combination of software running on general purpose processors and dedicated hardware components. Compression efficiency of encoders is typically defined by the bit rate and the perceived image quality of the decompressed video stream. In many applications, it is desirable to have a constant bit rate, maximum bit rate, or substantially constant bit rate while maintaining a good quality image. This can be particularly challenging for real time encoders that encode image data that has a high variability in content from picture to picture and/or within the same picture or when encoding/decoding pictures with high resolutions, high frame rate, or when low latency is desired.

Prior to compressing a new picture from a stream of pictures, a codec estimates the size of the encoded picture that would result from the compression of the new picture in order to select the appropriate configuration parameters to use for processing this new picture (e.g., in particular the estimated size can be used in the selection of an appropriate Quantization Parameter (QP)). In standard low latency compression approaches, this estimation is based on compression statistics related to the encoding of pictures preceding the new picture in the compression order. The compression statistics may include the actual final compression size of preceding encoded pictures, as well as additional information related to the compression of these preceding pictures in the codec. Thus, in standard low latency compression approaches, in order to use the most recent compression statistics, the codec waits for the completion of the compression of the picture which precedes the new picture before starting encoding the new picture. This enables the codec to use the latest compression statistics to estimate the size of the new picture (where this size is based on compression statistics related to the compression of the preceding picture, when the compression of the preceding picture is completed (for example, when the final compression size of the preceding picture is known)). Further, when encoding a picture, one or more reference pictures can be needed, and one of the references can be the preceding picture, such that the codec needs to wait for the completion of the compression of the preceding picture prior to compressing the new picture. However, these standard approaches have significant limitations when compression is performed in a real time environment where streams of pictures have high frame rates and/or high resolutions; and/or where low latency is desired.

SUMMARY

One general aspect includes a method of compressing a stream of pictures in parallel in a compression device, where the compression device includes at least a first and a second component, the method including: processing a first portion of a first picture of a stream of pictures in the first component of the compression device, while simultaneously processing a second portion of a second picture of the stream of pictures in the second component of the compression device according to partial compression statistics associated with the second picture, where the partial compression statistics result from the processing of the second picture in the compression device when compression of the second picture is not yet completed.

One general aspect includes a compression device including: a first and a second component to perform a partial compression operation, where the partial compression operations are part of an image data compression process; a non-transitory computer readable storage medium to store instructions; and one or more processors coupled with the non-transitory computer readable storage medium to process the stored instructions to configure the first component to process a first portion of a first picture of a stream of pictures; and to configure the second component to simultaneous process a second portion of a second picture of the stream of pictures in the second component of the compression device according to partial compression statistics associated with the second picture, where the partial compression statistics result from the processing of the second picture in the compression device when compression of the second picture is not yet completed.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
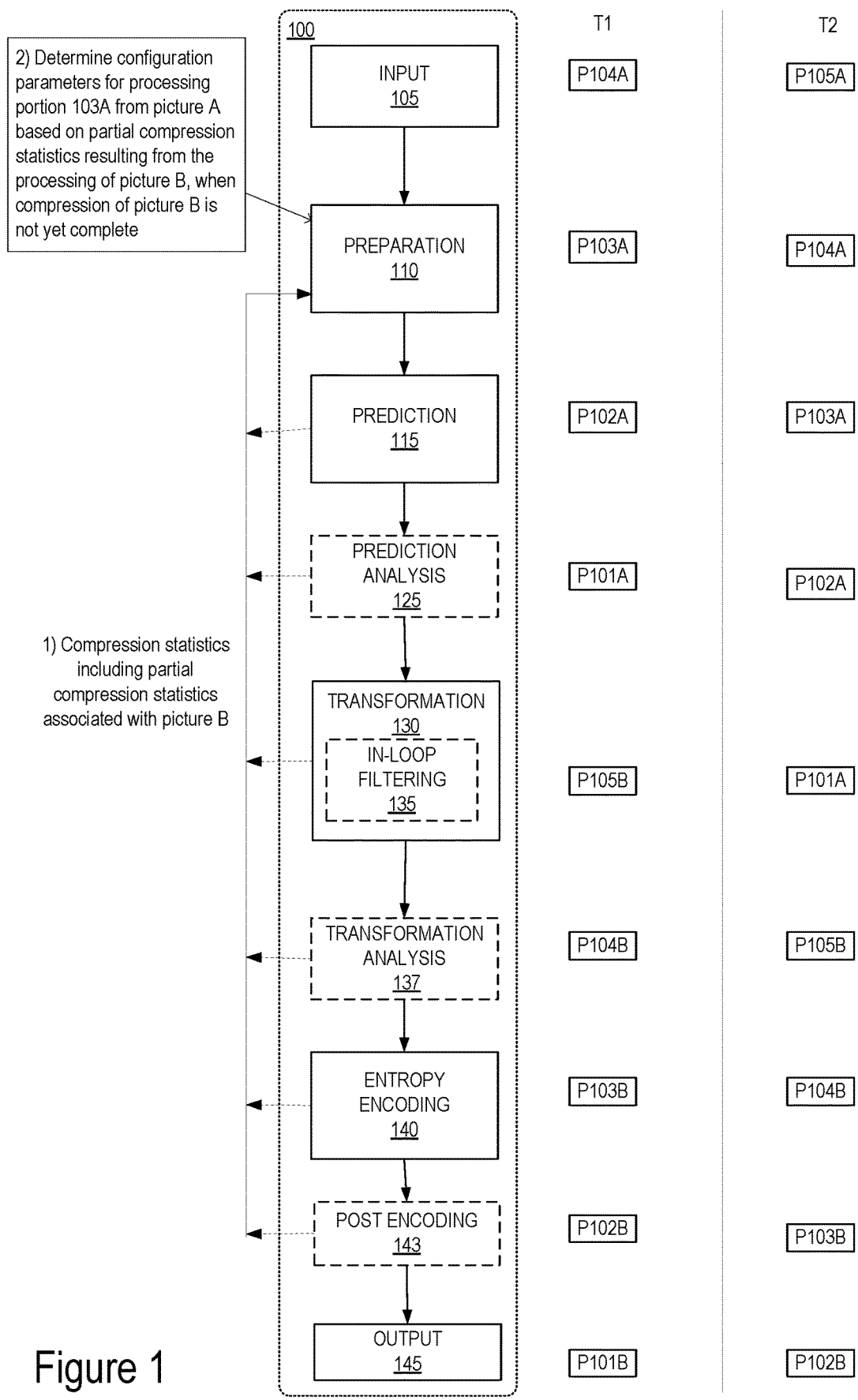
FIG. 1 illustrates a block diagram of an exemplary compression pipeline enabling parallel processing of image data in accordance with some embodiments of the invention.
Figures 2A, 2B:
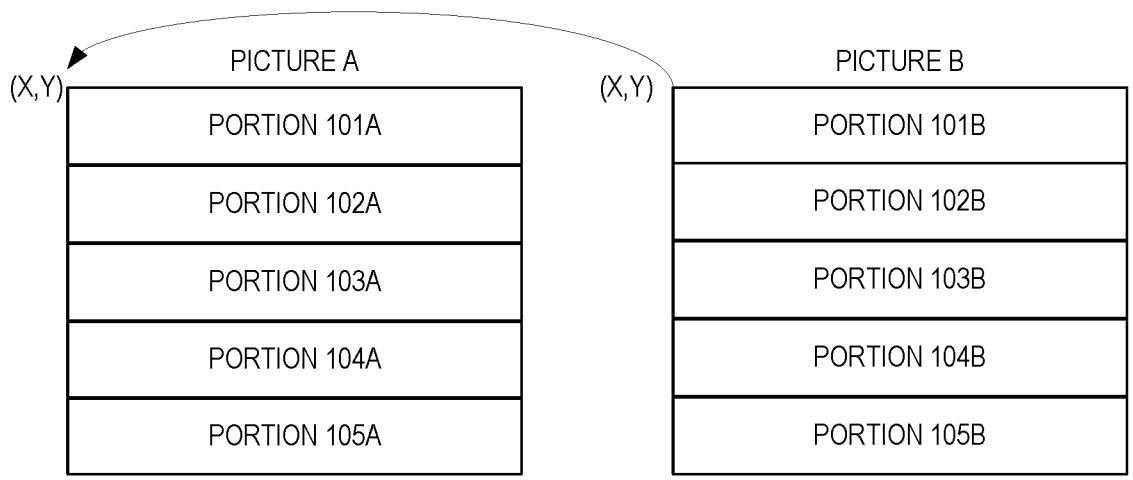
FIGS. 2A, 2B, 2C and 2D illustrate block diagrams of exemplary pictures A, B, C and D each including a set of portions in accordance with some embodiments of the invention.
Figures 2C, 2D:
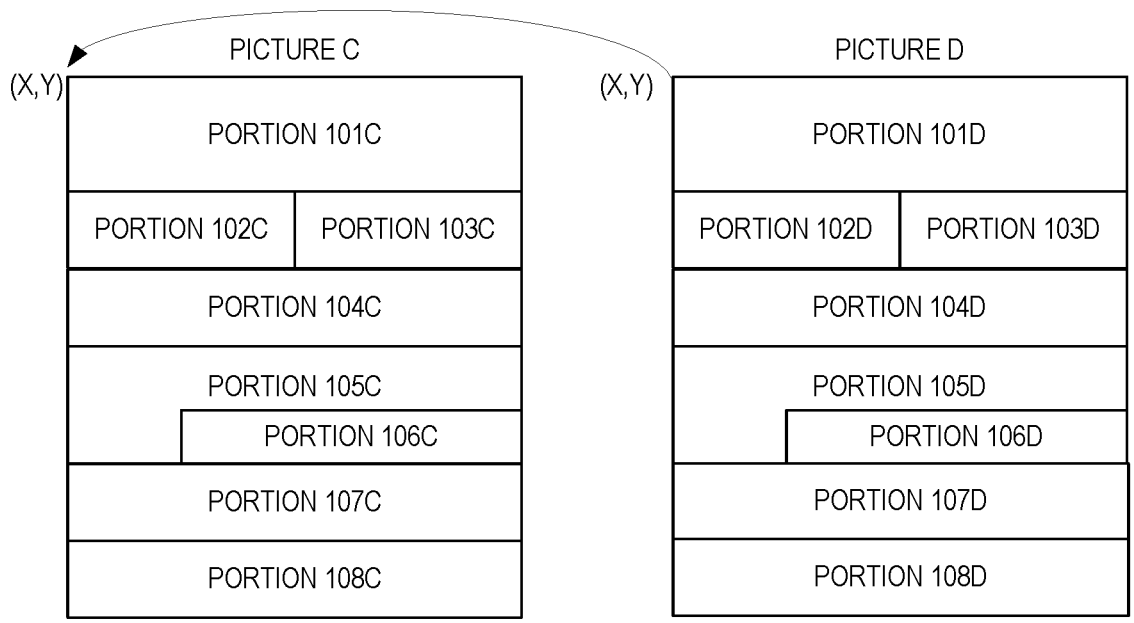

The following description describes methods and apparatus for compressing a stream of pictures in parallel in a compression device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments of the present invention describe a method and apparatus for enabling parallel compression of image data in a compression device. According to some embodiments, each picture from a stream of pictures to be compressed in a compression device is divided in multiple portions. The portions are processed in parallel in the compression device, where the compression device includes multiple components forming a compression pipeline. Each portion is processed according to most recent compression statistics associated with other portions of pictures. In particular in one embodiment, a first portion of a first picture of a stream of pictures is processed in a first component of the compression device, while a second portion of a second picture of the stream of pictures is simultaneously processed in a second component of the compression device. The first portion is processed according to partial compression statistics associated with the second picture, where the partial compression statistics include information resulting from the processing of the second picture in the compression device when compression of the second picture is not yet completed. The present invention presents clear advantages with respect to standard parallel compression mechanisms that speed up the compression process for a single stream since it allows the compression of portions of different pictures of the same stream concurrently on multiple components of the compression pipeline, providing a higher potential of parallelism in the encoder that can be used to provide a higher compression frame rate (e.g., frames per second (FPS)) and/or a higher image resolution and/or a lower latency of the compression. In some embodiments, mechanisms for processing portions of different pictures in a codec in parallel while enabling a constant bit rate are described based on partial compression statistics.

While the embodiments below will be described with respect to a codec (i.e., a device enabling compression and decompression of image data), other embodiments can be performed in a device which enables compression only, which may be referred to as an encoder without departing from the scope and spirit of the present invention.

FIG. 1 illustrates an exemplary block diagram of a compression pipeline 100 enabling parallel processing of image data in accordance with some embodiments. The compression pipeline represents multiple operations 105-145 performed in a codec (e.g., codec 800) for compressing image data. The compression pipeline 100 includes an input operation 105, a preparation operation 110, a prediction operation 115, a transformation operation 130, an entropy encoding operation 140, a post encoding operation 143, and an output operation 145 for processing image data. In some embodiments, the compression pipeline may further include a prediction analysis operation 125 and a transformation analysis operation 137. In alternative embodiments, the pipeline 100 does not include at least one of the prediction analysis 125 and the transformation analysis 137.

The image data may correspond to a stream of pictures, a picture, and/or a portion of a picture. A picture may refer to a frame when the scan mode of the stream of pictures is progressive. Alternatively, a picture may refer to a field when the scan mode of the stream of pictures is interlaced. In some embodiments, a portion of a picture may correspond to one or more macroblocks. For example, a portion of a picture may be a slice or a plurality of slices. In the embodiments described below a portion represents a parallelized item such that each operation of the compression pipeline 100 is operative to process a portion of a picture at a given time T, while other operations of the pipeline are operative to process other portions of pictures at that same time T. For example, as illustrated in FIG. 1 the transformation operation 130 may process portion 105B of picture B at time T1 while portion 103A of picture A is processed at the preparation operation 110 at that same time T1.

According to one embodiment, at the input operation 105 a request to compress image data is received. The preparation operation 110 is operative to determine the configuration parameters for configuring each following operation of the pipeline for processing a current portion of a first picture. The determination of the configuration parameters for a current portion of a first picture is based at least in part on compression statistics resulting from the processing of other portions in the compression pipeline. The more recent these statistics are in terms of picture timeline, better the prediction for a new picture will be. In some embodiments, the compression statistics include partial compression statistics resulting from the partial processing of a picture in the pipeline. For example, the partial compression statistics result from the processing of other portions of the same picture (first picture) and/or portions of pictures which precede the first picture in the compression pipeline 100 while the compression of this picture is not yet complete. In some embodiments, the configuration parameters may also be determined based on compression statistics related to the processing of portions of other pictures which have completed their processing in addition to the partial compression statistics. As will be described in further details below, the partial compression statistics may include information related to the processing of a portion when the portion has completed its processing (e.g., effective size of the encoded portion), or intermediary information related to the processing of the portion at other operations of the pipeline.

The prediction operation 115 is operative to determine a prediction mode for processing the portion of the picture. At the prediction operation 115, a portion of a picture and reference pictures are received and an intra prediction or an inter prediction mode for the compression of the portion of the picture is selected. If intra prediction is selected, information contained only within the current picture may be used for the prediction. If inter prediction is selected, information from a previously encoded picture may be used in the prediction. The selection of the prediction mode is made using a variety of factors, such that the difference between a prediction and the portion of the picture is minimized Prediction parameters are generated (e.g., partitioning of the portion of picture, motion vectors, and selected reference pictures) according to the selected prediction mode. The prediction parameters are then used in the following operation of the pipeline.

The prediction parameters, mode selection and reference pictures are used at the transformation operation 130 to generate the prediction, which is subtracted from the portion of the picture to generate a residual. The residual is then transformed and quantized according to a quantization parameter (QP, which is determined at least in part based on partial compression statistics) to obtain a set of quantized transform coefficients. The transformation applied may depend on the algorithm followed for the compression. For example, under H.264 standard, various transforms are used depending on the type of residual data that is to be coded: a 4×4 or 8×8 DCT-based transform (Discrete Cosine Transform) is performed on luma and chroma coefficients and a Hadamard transform may be performed on DC coefficients in intra macro blocks predicted in 16×16 mode. Under other standards, other transforms may be used, as appropriate. The quantized transform coefficients generated are scaled (Q−1) and inverse transformed to produce a difference portion. The prediction is added to the difference portion to form a reconstructed portion of the picture. The reconstructed portion is a decoded and unfiltered version of the original portion of the picture. The reconstruction portion may be passed directly to the in-loop filtering operation 135. In some embodiments, filtering is performed to reduce the effects of blocking distortion and the reconstructed reference picture is created from a series of blocks. In some embodiments, the in-loop filtering is skipped.

The reconstruction parameters and transform coefficients are then used by the entropy encoding operation 140. In accordance with some embodiments, at operation 140, entropy encoding can be performed on the transform coefficients using any known entropy encoding mappings. For example, this may be done by mapping a 2×2, 4×4, or 8×8 block of quantized transform coefficients to a 4, 16, or 64-element array, respectively. Elements may be encoded using either variable-length codes such as context-adaptive variable length codes (CAVLC) and Exp-Golomb codes or using context-adaptive arithmetic coding (CABAC), depending on the entropy encoding mode, as per H.264. Other entropy encoding compression schemes may also be applicable. Similarly, the reconstruction parameters may be encoded using any known entropy encoding mappings. Finally, the compressed portion of the picture is output at operation 145.

In one embodiment, partial statistics related to the compression of a picture are gathered at each one of the prediction analysis operation 125, the transformation analysis operation 137 and the post encoding operation 143. These partial statistics are then fed back to the preparation operation 110 for determining the configuration parameters for processing a portion of a picture. In other embodiments, partial statistics are gathered from at least one of the prediction analysis operation 125, the transformation analysis operation 137 and the post encoding operation 143. For example, in one embodiment, partial statistics related to the compression of a picture are gathered at the post encoding operation 143 only and transmitted to the preparation operation 110. In some embodiments, one or more of the operations 125, 137 and 143 can be skipped.

Upon receipt of a request for compression of image data from an application, the codec is configured according to the compression request and configuration parameters to compress the image data. The configuration parameters may be general parameters defining how the image data is to be compressed. For example, the configuration parameters may comprise picture resolution and timings (e.g. pixel format, size, pixel depth, scan mode, frame rate), slice type and size, information relative to the sequence of pictures (e.g. picture hierarchy, Group Of Picture (GOP) structure (I period, P period, Idr period), GOP offset, a target bit rate, allowed drift from the target bit rate, the latency, coding functions and other information delimiting the operational mode of the codec for processing the stream of pictures (e.g. rate control mode, Minimum and maximum QP, QP correction tensors, QP offsets, scene detection threshold).

In some embodiments, the request received is for processing a stream of pictures and the request is broken down into multiple requests for processing portions of the picture. In other embodiments, the request received may be for processing a portion of a picture and the request is processed without being broken down. At a given time T, the compression pipeline 100 is operative to process multiple portions of multiple pictures simultaneously.

In some embodiments, each operation of the pipeline processes one or more portions at a given time. As illustrated in the example of FIG. 1, picture B includes portions 101B-105B, where each portion is being processed at a different operation of the pipeline 100 in parallel to portions 101A-104A of picture A being processed at other operations of the pipeline 100. FIGS. 2A, 2B, 2C and 2D illustrate block diagrams of exemplary pictures A, B, C and D each including a set of portions in accordance with some embodiments. In the illustrated example, pictures A and B are divided into a same number of portions, where each portion has a corresponding portion in the other figure which is identical in size and position (e.g., portions 101A, 102A, 103A, 104A, and 105A correspond to portions 101B, 102B, 103B, 104B, and 105B respectively; each of these couples of portions (e.g., 101A and 101B) are located at the same position (X, Y) within their respective pictures and have the same size (i.e., include the same number of macroblocks)). Alternatively, pictures C and D have a different number of portions than pictures A or B (here 8 portions 101C-108C and 101D-108D respectively). In the illustrated example, pictures C and D are divided into a same number of portions, where each portion has a corresponding portion in the other figure which is identical in size and position (e.g., each one of portions 101C-108C corresponds to a portion from the portions 101D-108D respectively; each of these couples of portions (e.g., 101C and 101D) are located at the same position (X, Y) within their respective pictures and have the same size (i.e., include the same number of macroblocks)). While embodiments are described with respect to portions from pictures A and B or C and D being processed in parallel within the compression pipeline 100, the embodiments of the invention apply to portions of pictures of varying sizes such that portions of two or more pictures may be processed simultaneously within the same compression pipeline regardless of the number of portions or size of these portions included within each picture. For example, portions A and C can be processed in parallel in the compression pipeline. In some embodiments, picture A follows picture B and picture C follows picture D in a compression order which may be different or the same as a display order of the pictures.

At time T1 after the portion 103A of picture 1 is input to the pipeline with a request to compress this portion, it is processed at the preparation operation 110 in which configuration parameters are determined for processing the portion in other stages of the pipeline 100. At that same time T1, the multiple portions of picture B are processed at different stages of the pipeline. Portion 105B of picture B is processed at the transformation operation 130, portion 104B is processed at the transformation analysis operation 137, portion 103B is processed at the entropy encoding operation 140, portion 102B is processed at the post encoding operation 143, while the portion 101B is output at operation 145. Thus, when the portion 103A is being prepared for processing at operation 110, each portion of picture B has already been processed in one or more stages of the pipeline 100. For example, at time T1, portion 105B has been processed at the input operation 105, the preparation operation 110, the prediction operation 115, and the prediction analysis 125 prior to being processed at the transformation operation 130, and portion 101B has already been processed by all stages of the pipeline and is being output at operation 145.

At time T1 when the codec prepares for processing portion 103A of picture A, the codec has gathered partial compression statistics related to picture B resulting from the processing at different stages of the pipeline of portions of picture B. The partial compression statistics may include a set of statistics resulting from the processing of portion 101B at each operation of the pipeline (i.e., at operations 115, 125, 130, 137, 140, and 143). In some embodiments, the partial compression statistics may further include a set of compression statistics resulting from the processing of the portion 102B at operations 115, 125, 130, 137, and 140; and a set of statistics resulting from the processing of the portion 103B at operations 115, 125, 130, and 137; a set of compression statistics resulting from the processing of the portion 104B at operations 115, 125, and 130; and/or from the processing of the portion 105B at operations 115 and 125. In some embodiments, the partial compression statistics may further include statistics related to the operation at which the portions are currently being processed. For example, these statistics may include configuration parameters used to process each of the portions at the operation at which it is being processed. Thus, when portion 103A from picture A is being processed at the preparation operation 110 of pipeline 100, this preparation is performed according to partial compression statistics representative of a result of the processing of one or more portions of picture B that are currently being processed in the pipeline while the compression of picture B is not complete. In some embodiments, the partial statistics include statistics resulting from the processing of portions of a picture (e.g., picture B) in the entire pipeline (e.g., portion 101B) while other portions of the picture have not yet been completed enabling the pipeline to process in parallel more than one picture. Thus, the pipeline 100 is operative to simultaneously process portions of different pictures increasing the efficiency of the compression pipeline while taking into account, in real time, the result of the processing of the different portions in order to increase the quality of the compression and/or obtain a desired compression bit rate. While the embodiments herein are described with reference to partial statistics of a picture B used to determine configuration parameters for portions of picture A (which is different from picture B), the invention is not so limited and partial compression statistics of a picture (resulting from the processing of one or more portions of this picture) can be used to determine configuration parameters for a portion from that same picture.

In some embodiments, the codec is operative to use compression statistics resulting from the processing of portions within the compression pipeline as soon as these statistics are available from the different stages of operations. Thus, the embodiments described herein with respect to the scheduling of portions from picture A, B, C and D are exemplary only and not limiting. For example, the order of execution of the operations of the pipeline may be performed in different order such that compression statistics of some portions are made available for processing a given portion in order to provide added precision for the compression of the portion. In one example, the prediction analysis operation 125 for processing portion 101A, the transformation analysis operation 137 for processing 104B, and the post encoding operation 143 for processing 102B can be scheduled prior to the scheduling of the preparation operation 110 for processing portion 103A rendering the statistics collected from these stages available for determining the configuration parameters for processing portion 103A.

As an example, the partial compression statistics may be used to estimate the distortion of a portion of a picture and to predict the number of bits necessary to encode these portions. The analysis of the partial compression statistics related to picture B currently being processed in the pipeline (and optionally of other compression statistics associated with other portions of pictures previously compressed) provides a better estimation of the compression size of portion 103A. For example, this estimation is used to determine an updated quantization parameter. The use of this quantization parameter in the transformation operation 130 during the processing of portion 103A will improve the overall quality and distortion for the stream of pictures and may be used to achieve a substantially constant bit rate. In one embodiment, the determined quantization parameter may be selected to minimize the difference between a used number of bits and an allocated number of bits for the stream of pictures in order to respect a bit budget consistent with a desired constant bit rate. In a non-limiting example, for each portion processed in the compression pipeline the partial compression statistics may include the size of the encoded data gathered at the post encoding operation 143 and used in the prediction of the number of bits necessary to encode a new portion. Further the partial compression statistics may include an effective QP and distortion control's QP offset correction used at the transformation operation 130 for a portion (and gathered when the portion is processed at the transformation analysis operation 137). The partial compression statistics may also include the sum of absolute differences (SAD) of image data gathered at the prediction analysis operation 125 (e.g., Rate control prediction compensation, Distortion control's PSNR).

When processing of a portion is completed at an operation of the compression pipeline 100, the portion is scheduled to be processed at the next operations. For example, at a second time T2, each one of the portions 102B-105B and 101A-105A are moved to the next operation in the pipeline. The portion 103A is processed at the prediction operation 115 according to the configuration parameters determined based, at least in part, on the partial compression statistics associated with picture B. In some embodiments, each portion of a picture may be of different size and complexity resulting in a varying processing time at each operation of the pipeline. Thus, while time T2 shows that each portion has been transferred to the next processing operation of the pipeline, in other embodiments, some portions may remain in the same processing operation while others are ready to be transferred. In one of these embodiments, a completed portion may be transferred to a processing queue of the next operation to enable the codec to schedule a new portion in the processing operation of the completed portion even if the processing of the completed portion cannot yet start at the next processing stage. In some embodiments, as will be described in further details below, each processing operation of the pipeline may include more than one component for performing the corresponding operation simultaneously on more than one portion of a picture. In these embodiments, a completed portion may be transferred to a second component of the next processing operation, as long as a component of the next processing operation is available, even though another portion is still being processed at the next processing operation.

Figure 3:
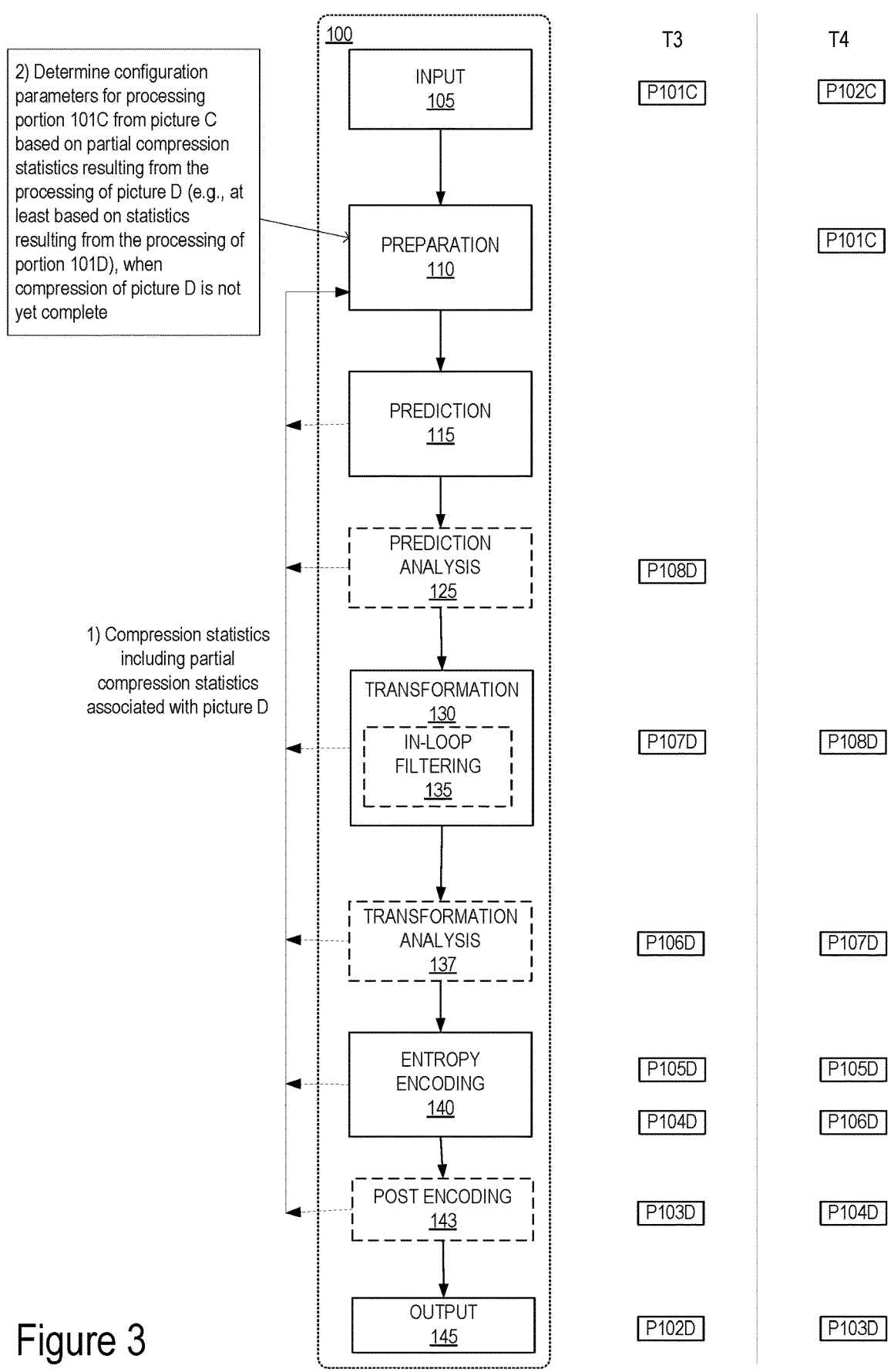
FIG. 3 illustrates a block diagram of an exemplary scenario in which more than one portion may be processed at each operation of the compression pipeline in accordance with some embodiments of the invention.

While the embodiments of FIG. 1 describe an exemplary compression pipeline 100 in which each operation of the pipeline processes a single portion of a picture at a given time; in other embodiments, each operation may be operative to independently process more than one portion in parallel. FIG. 3 illustrates a block diagram of an exemplary scenario in which more than one portion may be processed at each operation of the compression pipeline 100 in accordance with some embodiments. The embodiments of FIG. 3 will be described with reference to FIGS. 2C and 2D respectively illustrating picture C and picture D. While embodiments are described with respect to portions from pictures C and D being processed in parallel within the compression pipeline 100, the embodiments of the invention apply to portions of pictures of varying sizes such that portions of two or more pictures may be processed simultaneously within the same compression pipeline regardless of the number of portions or size of these portions included within each picture.

Figure 8:
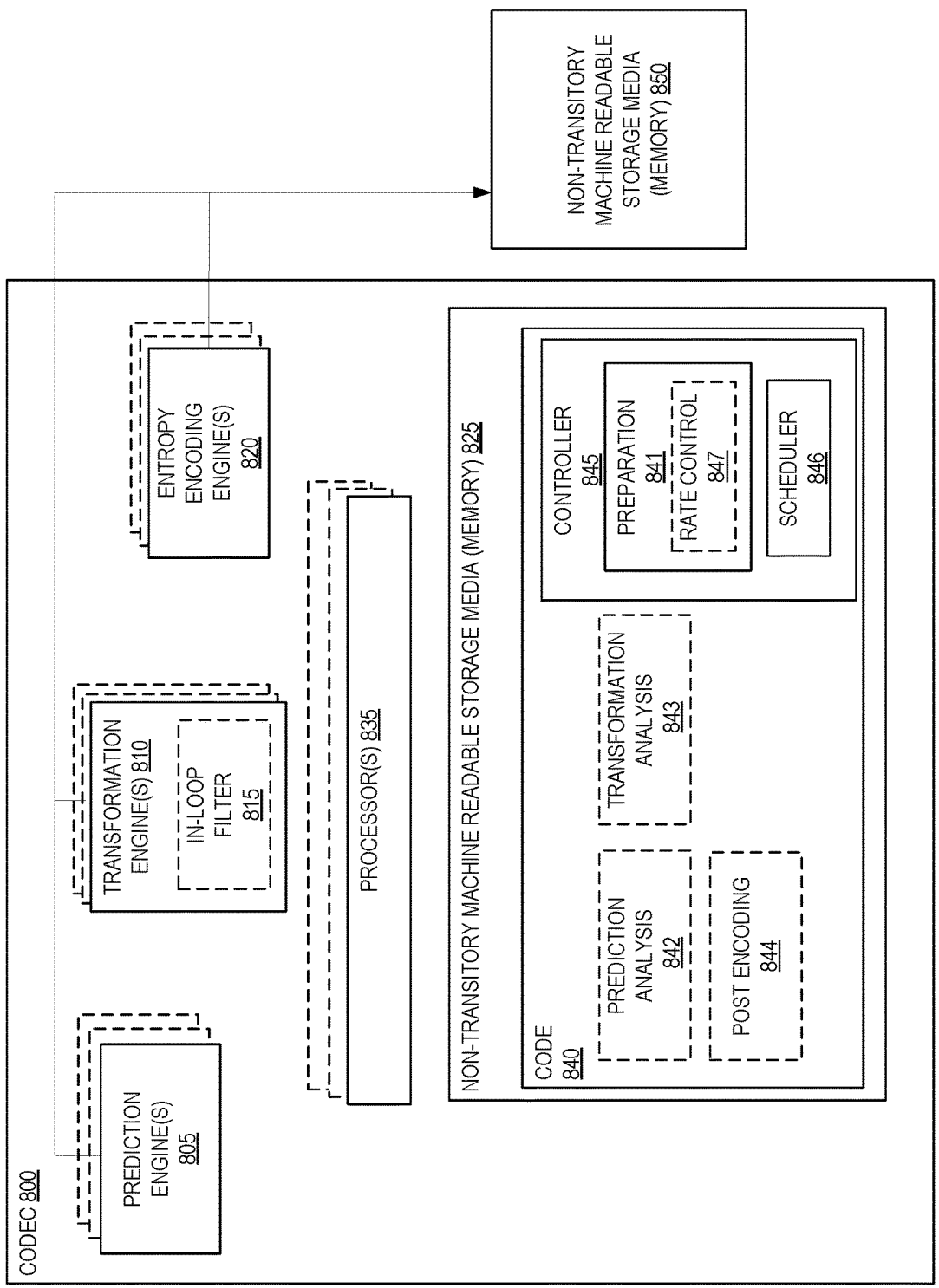
FIG. 8 is a block diagram of an exemplary codec for implementing a compression pipeline enabling parallel compression of streams of pictures in accordance with some embodiments of the invention.

As will be described in further details below with reference to the codec 800 of FIG. 8, each stage of the pipeline 100 can be implemented through one or more independent components such that at a moment T, one or more portions of a picture can be processed in that same stage. For example, in FIG. 3, at time T3, portion 101C of picture C is processed at the input operation 105 of the pipeline while portions 102D-108D of picture D are simultaneously processed at other operations of the pipeline 100. In this example, portion 105D and portion 104D, from picture D, are simultaneously processed at the entropy encoding operation 140. Although FIG. 3 illustrates a single entropy encoding 140, each of the portions 105D and 104D is processed in an independent component (e.g., the independent components can be separate hardware components dedicated to the execution of the entropy encoding operation and/or multiple threads scheduled on one or more general purpose processors, each thread performing the entropy encoding operation). While FIG. 3 illustrates two portions being processed at the entropy encoding operation 140, this is exemplary only and not limiting, in some embodiments, the entropy encoding operation is operative to process more than two portions in parallel. In addition, in other embodiments, each stage of the pipeline is operative to process more than one portion in parallel.

In one embodiment, at time T4, processing of portion 104D is completed at the entropy encoding operation 140, while the processing of portion 105D is not complete. The portion 104D is scheduled to be processed at the post encoding operation 143 while the portion 105D continues to be processed at the entropy encoding operation 140. Simultaneously portion 101C of picture C is processed at the preparation operation 110, while a new portion 102C is input at operation 105. In these embodiments, when portion 101C is processed at the preparation operation, the codec determines configuration parameters for processing portion 101C from picture C based on partial compression statistics resulting from the processing of picture D (e.g., at least based on statistics resulting from the processing of portion 101D of picture D), when compression of picture D is not yet complete. The partial compression statistics may result from the processing of portions of picture D at multiple components of a same operation of the compression pipeline 100.

The operations in the flow diagrams will be described with reference to the exemplary embodiments of the other figures. However, it should be understood that the operations of the flow diagrams can be performed by embodiments of the invention other than those discussed with reference to these other figures, and the embodiments of the invention discussed with reference to the other figures can perform operations different than those discussed with reference to the flow diagrams.

Figure 4:
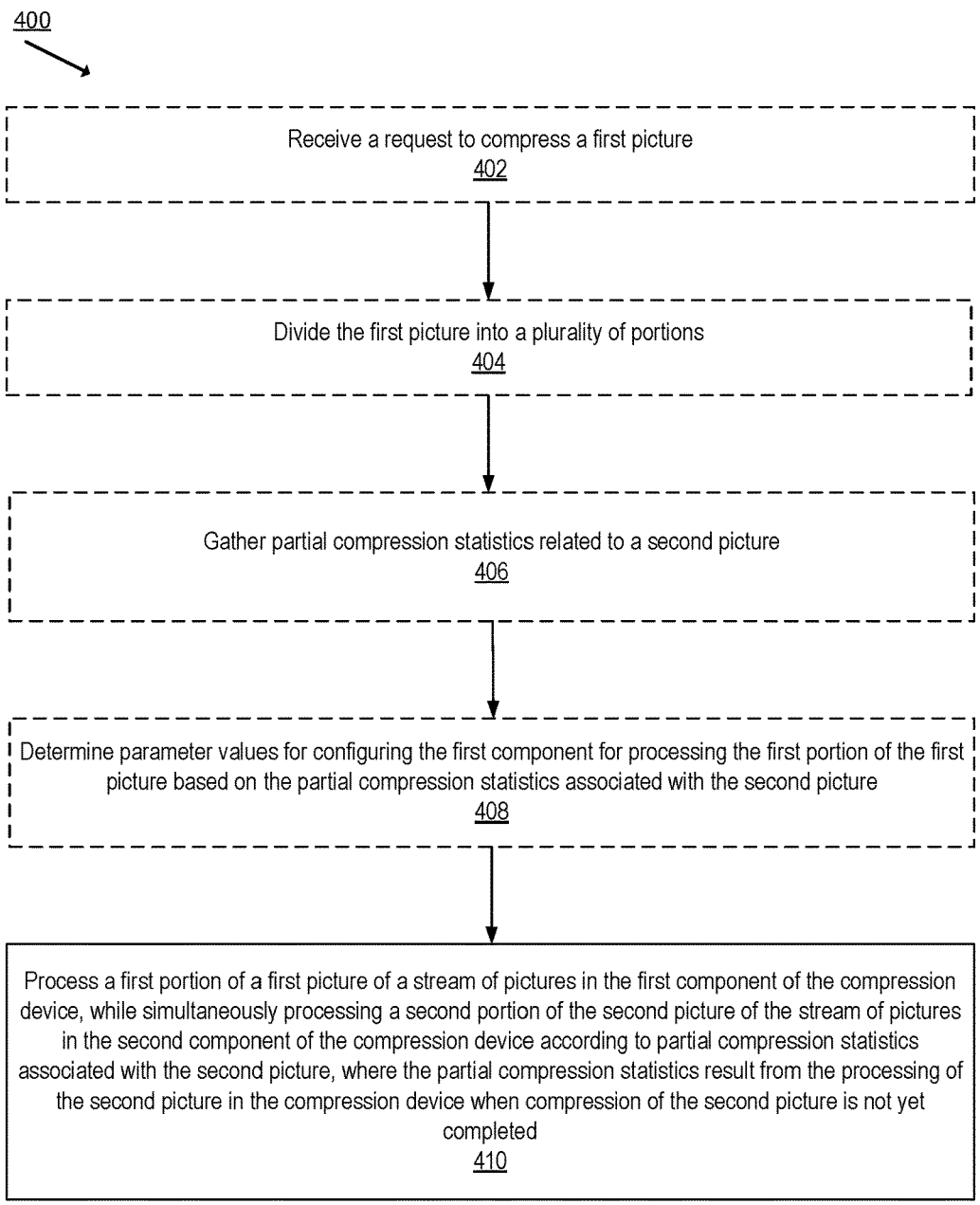
FIG. 4 illustrates a flow diagram of operations for enabling parallel compression of a stream of pictures in accordance with some embodiments of the invention.

FIG. 4 illustrates a flow diagram of operations 400 for enabling parallel compression of a stream of pictures in a codec in accordance with some embodiments. At operation 402, the codec 800 receives a request to process the first picture. For example, an application may send a request to process a stream of pictures. This request is broken down into a plurality of requests for processing each picture of the stream and/or processing portions of pictures of the stream. The flow then moves to operation 404, at which the codec 800 divides a picture into one or more portions including at least a portion. In some embodiments, a portion of a picture may include one or more macroblocks, a slice or multiple slices. In an embodiment, a slice can include a subset or the entire picture. The flow of operations then moves to operation 406, at which the codec 800 gathers partial compression statistics related to another picture. The flow of operations then moves to operation 408, at which the codec 800 determines parameter values for configuring a first component of the pipeline 100 for processing the portion (e.g., a portion from any of the picture A of FIG. 1 or picture C of FIG. 3) based on partial compression statistics associated with the other picture (picture B or picture D). For example, the operation 408 is performed at the preparation operation 110 of pipeline 100 and the first component for which the parameter values are determined may be operative to perform one of the following operations of the compression pipeline 100: prediction 115, transformation 130, in-loop filtering 135, and entropy encoding 140. In some embodiments, the operation 408 is performed at a rate control operation part of the preparation operation 110, which is operative to determine configuration parameters based on the partial statistics of a picture currently being processed in the codec while enabling a constant compression bit rate for the stream of pictures.

Flow then moves to operation 410, at which the codec 800 processes the portion (e.g., portion 103A of picture A in FIG. 1 or portion 101C of picture C in FIG. 3) of a stream of pictures in the first component of the compression device (e.g., prediction 115), while simultaneously processing another portion of the other picture (e.g., any of portions 101B-105B of picture B, or any portion of picture C) of the stream of pictures in a second component of the compression device (e.g., transformation 130, transformation analysis 137, entropy encoding 140, post encoding 143, or output 145) according at least in part to partial compression statistics associated with the second picture. The partial compression statistics result from the processing of the other picture in the compression device when compression of the other picture is not yet completed.

The embodiments of the present invention present clear advantages with respect to standard approaches such that partial compression statistics resulting from the partial compression of a second picture in a codec enables the configuration of the codec to process a first portion of a first picture in parallel to the one or more portions of the second picture while the compression of the second picture is not yet complete. Where the second picture precedes the first picture in a compression order. This increases the compression speed by enabling the parallel execution of pictures of a same stream in a codec while maintaining a high level of precision and providing a constant bit rate and/or higher compression quality.

While the embodiments of FIG. 1 describe an exemplary compression pipeline 100 in which a first picture A and a second picture B are processed in parallel within the same pipeline without a delay between the processing of the different portions (e.g., at times T1 and T2 all stages of the pipeline are used), other embodiments may include exemplary scheduling scenarios in which a second picture may not be immediately processed at one of the components within the compression pipeline. In these embodiments, some conditions may need to be satisfied prior to initiating the processing of a portion of a picture while simultaneously processing portions of one or more other pictures in a compression pipeline as will be described in further details below.

Figure 5:
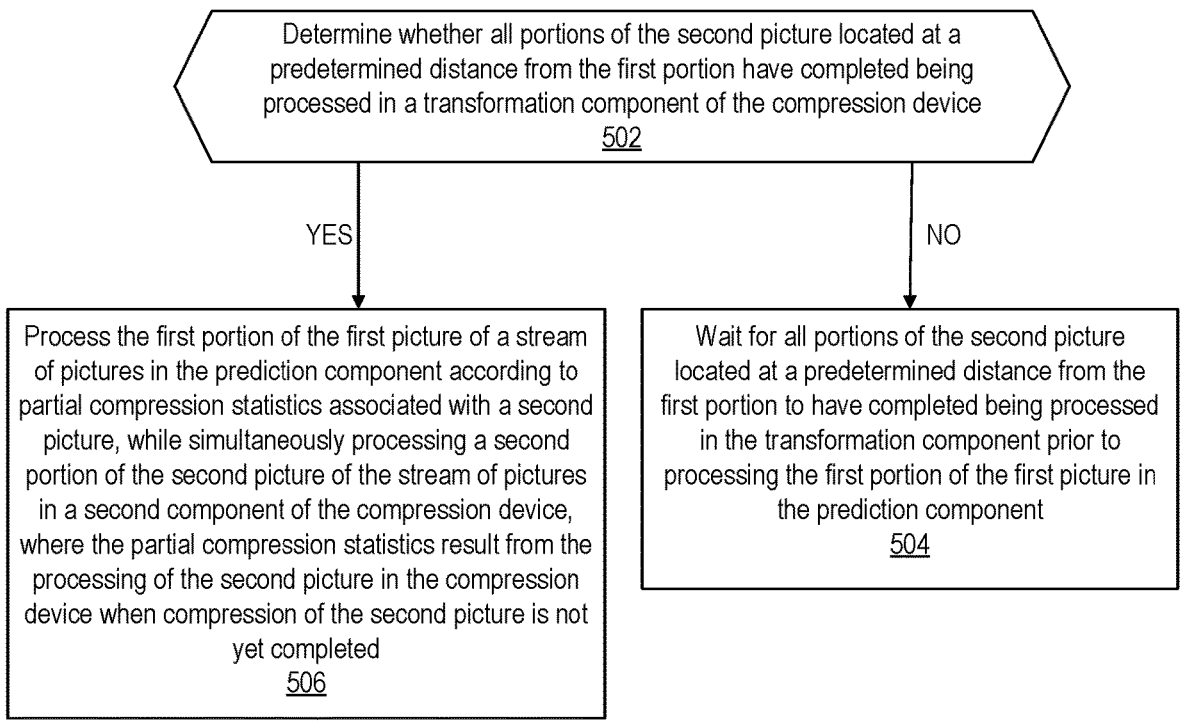
FIG. 5 illustrates a flow diagram of exemplary operations performed in a codec for processing a first portion of a first picture in a prediction operation while simultaneously processing one or more portions of a second picture in accordance with some embodiments.

FIG. 5 illustrates a flow diagram of exemplary operations performed in a codec for processing a first portion of a first picture in a prediction operation while simultaneously processing one or more portions of a second picture in accordance with some embodiments. In one embodiment, prior to processing a portion of a picture (e.g., portion 101C of picture C) in a prediction operation 115, a codec determines (operation 502) whether all portions of the second picture (e.g., picture D) located at a predetermined distance from the first portion have completed being processed in a transformation component of the compression device. In some embodiments, the predetermined distance may correspond to a height of a search window used at the prediction operation 115 for determining a prediction mode for compressing the first portion. For example, with reference to FIGS. 2C and 2D, prior to scheduling the portion 101C to be processed at the prediction operation, the codec may verify whether portions 101D, 102D and portion 103D have completed being processed at the transformation operation 130, when portions 102D and 103D are located within the predetermined distance from portion 101D. In a non-limiting exemplary embodiment, the predetermined distance may be 80 pixels.

If it is determined that at least one portion within the predetermined distance from the first portion has not yet completed being processed at the transformation operation 130, flow then moves from operation 502 to 504 at which the codec waits for these portions to have completed their processing prior to processing the portion at the prediction operation 115. Alternatively, if it is determined that all portions within the predetermined distance have completed the transformation operation, flow moves to operation 506 at which the prediction operation 115 is configured to process the portion (101C) according to partial compression statistics associated with the second picture (picture D), while simultaneously processing one or more portions of picture D in other components of the codec. The partial compression statistics result from the processing of the second picture (picture D) in the codec when compression of this picture is not yet completed. In the example of FIG. 3, when portion 101C completes the preparation operation 110 (at time T4) it is scheduled to be processed at the prediction operation 115 as portions 101D, 102D, and 103D which are within the predetermined distance have been processed at the transformation operation 130. By ensuring that portions of a preceding picture, which are located within the predetermined distance from the current portion, are processed at the transformation operation prior to processing the current portion, the prediction operation can use those portions as references.

Figure 6:
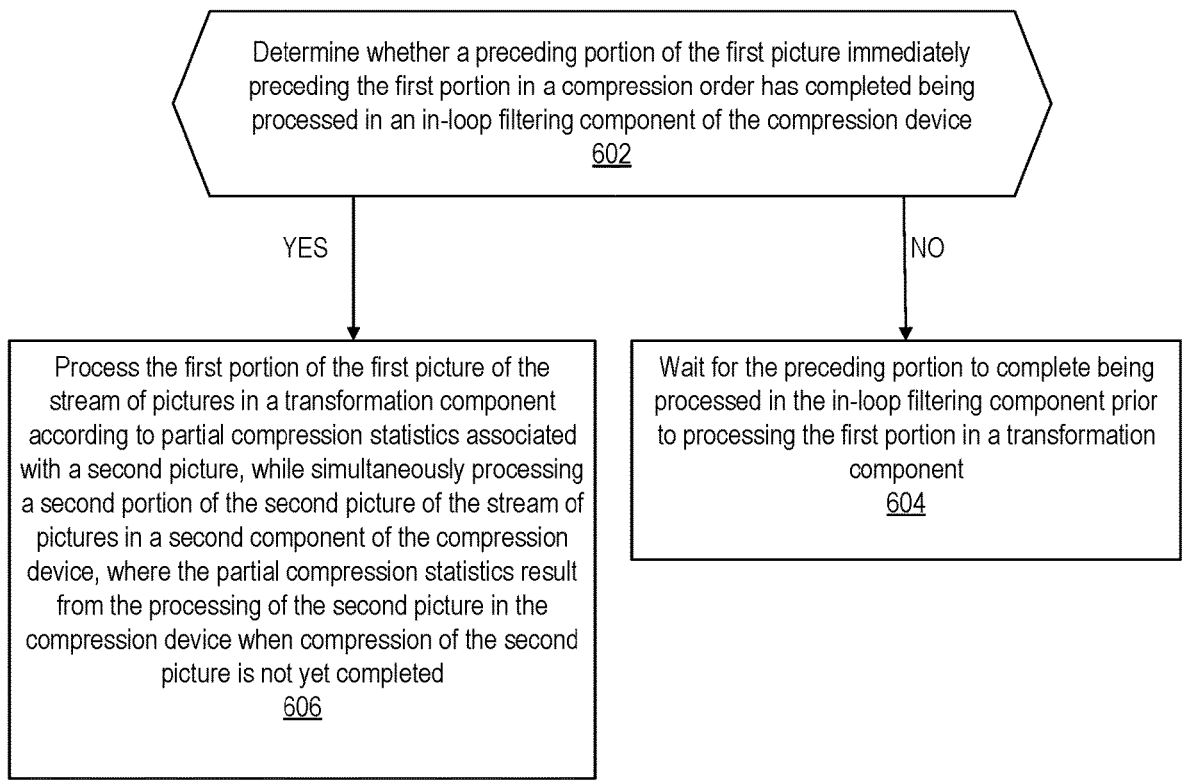
FIG. 6 illustrates a flow diagram of exemplary operations performed in a codec for processing a first portion of a first picture in a transformation operation while simultaneously processing one or more portions of a second picture in accordance with some embodiments of the invention.

FIG. 6 illustrates a flow diagram of exemplary operations performed in a codec for processing a first portion of a first picture in a transformation operation while simultaneously processing one or more portions of a second picture in accordance with some embodiments. In some embodiments, when the compression pipeline 100 includes multiple processing components for each operation of the pipeline, prior to processing a portion of a picture at an in-loop filtering operation 135 of the compression pipeline, the codec determines (at operation 602) whether a portion of the picture immediately preceding the portion in a compression order has completed being processed in an in-loop filtering component of the compression device. In a non-limiting example, when optional operation in-loop filtering 135 is enabled in the compression pipeline, prior to processing portion 108D in the in-loop filtering 135, the codec determines whether the portion 107D has been processed at the in-loop filtering operation 135. If it is determined that the preceding portion has not completed its processing at the in-loop filtering operation 135, the flow moves to operation 604 at which the codec waits for the preceding portion to complete being processed in the in-loop filtering component prior to processing the portion at the transformation operation 130. For example, if it is determined that the processing of portion 108D is complete at the prediction analysis 125 and that processing of portion 107D at the in-loop filtering operation 135 is not complete, the codec may not schedule the start of the processing of portion 108D at the transformation/in-loop filtering operation (even if the codec includes an additional component that can handle the processing in parallel of the portions at the transformation/in-loop filtering operations).

Alternatively, if it is determined that the preceding portion has completed its processing at the in-loop filtering operation 135, the flow moves to operation 606 at which the codec configures the transformation and in-loop filtering operations of the compression device to process the portion, while simultaneously processing a portion of another picture (portions 101C, 102C of picture C) in a second component of the compression device. By ensuring that a portion of a picture, which precedes a current portion, has completed being processed at the in-loop filtering operation the current portion can be processed at the transformation/in-loop filtering operation.

Figure 7:
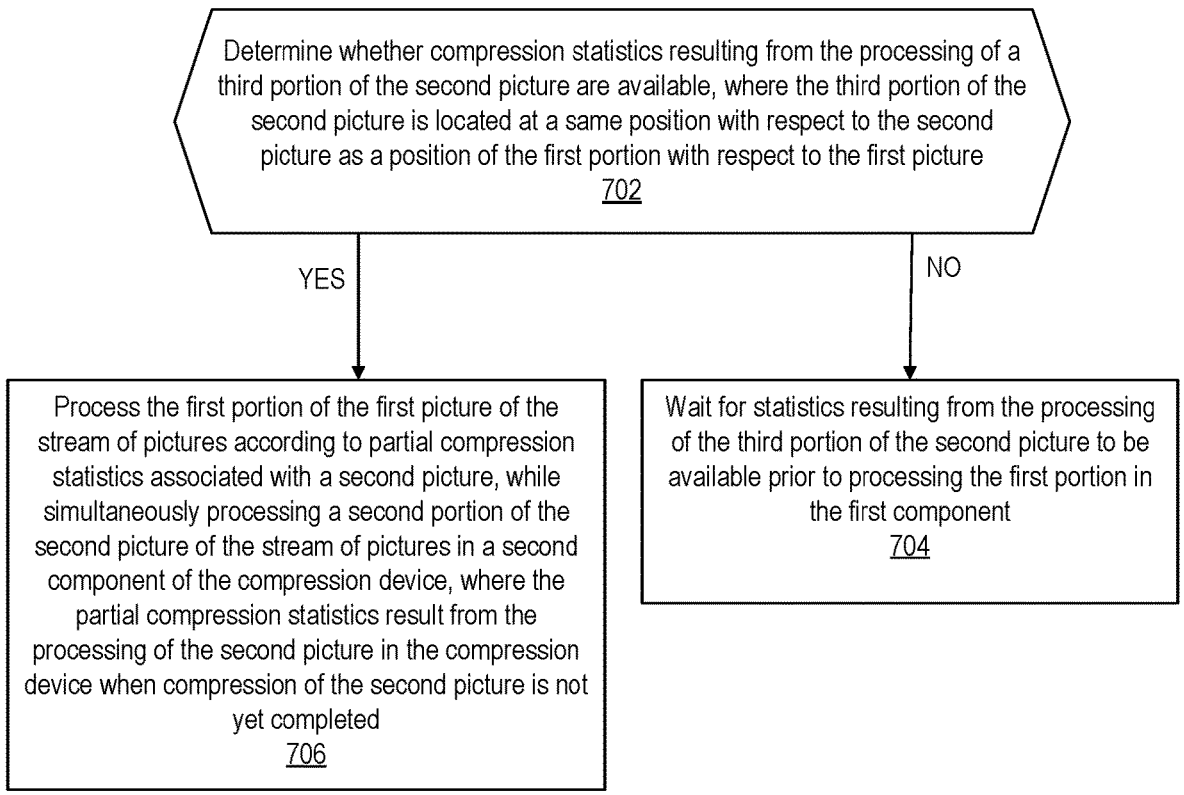
FIG. 7 illustrates a flow diagram of exemplary operations performed in a codec for processing a first portion of a first picture while simultaneously processing one or more portions of a second picture in accordance with some embodiments of the invention.

FIG. 7 illustrates a flow diagram of exemplary operations performed in a codec for processing a first portion of a first picture while simultaneously processing one or more portions of a second picture in accordance with some embodiments of the invention. In some embodiments, prior to processing a first portion of a picture (e.g., portion 101C of picture C) at a component of the compression device (e.g., preparation operation 110), the codec determines (operation 702) whether statistics of a portion of the second picture (picture D) located at a same position as the first portion of the first picture (in this example, portion 101D of picture D which is located at the same position of the picture) are available to the preparation operation 110. In some embodiments, these statistics are available when the portion of the second picture has completed being processed in the compression device. In other embodiments, these statistics are available when the portion of the second picture has at least completed being processed in the transformation analysis operation 137. For example, when portion 101C is received at the input operation 105, the codec determines whether the statistics of portion 101D are available prior to scheduling the start of the processing of the portion at a component of the codec (e.g., preparation operation 110).

In one embodiment, if it is determined that the statistics of the preceding portion are not available, the flow moves to operation 704 at which the codec waits for the portion located at the same position to complete being processed and for the statistics to be available prior to scheduling the processing of the portion at a component of the compression pipeline. In an alternative embodiment, the codec can wait for the portion located at the same position to have completed being processed at the transformation analysis 137 and for the statistics to be available at least from the transformation analysis operation 137.

If it is determined that the statistics are available, the flow moves to operation 706 at which the codec configures a component of the compression device to process the portion, while simultaneously processing a second portion of the second picture in a second component of the compression device. For example, upon determining that portion 101D has been processed at the compression device and compression statistics related to the processing are available to the codec, the codec configures the preparation operation 110 for processing portion 101C of picture C. In an alternative embodiment, the codec can configure the preparation operation 110 for processing portion 101C of picture C located at the same position as portion 101D as soon as portion 101D has completed being processed at the transformation analysis operation 137 and compression statistics related to this processing are available. The preparation operation 110 is then performed based on partial compression statistics resulting from the processing of the second picture D in the compression device when compression of the second picture is not yet completed. Thus, even though the processing of picture D is not completed, the codec is operative to use partial compression statistics (e.g., compression statistics resulting from the processing of portion 101D) to configure the pipeline for processing portion 101C while maintaining a high precision and a substantially constant compression bit rate.

While the embodiments described herein refer to two pictures being processed in parallel and to the codec determining the availability of the statistics of a portion prior to processing another portion from another picture at the same location, in other embodiments, the pipeline is operative to process more than two pictures in parallel. In these other embodiments, prior to processing a portion, the codec may determine whether statistics are available from two or more portions located at the same position in two or more pictures respectively (when these pictures are compressed in parallel in the compression pipeline).

Architecture

The pipeline 100 may have several implementations. In particular the pipeline 100 can be implemented as 1) a special-purpose compression/decompression device that uses custom application-specific integrated-circuits (ASICs) and a special-purpose operating system (OS); and 2) a general purpose compression/decompression device that uses common off-the-shelf (COTS) processors and a standard OS. FIG. 8 is a block diagram of an exemplary codec 800 for implementing a compression pipeline enabling parallel compression of streams of pictures in accordance with some embodiments. The codec 800 provides an exemplary special purpose compression/decompression device for implementing the parallelized compression pipeline 100 according to some embodiments. In alternative embodiments other pipelines (with a different task combination and division) can be used to enable parallel processing of image data and therefore other codec architectures can be used for implementing the pipeline without departing from the scope of the present invention.

The illustrated exemplary codec 800 discloses multiple dedicated hardware components (e.g., a multiple prediction engine(s) 805, multiple transformation engines (810), and multiple entropy encoding engines 820) implementing a compression pipeline 100 in which a plurality of portions of pictures (from the same or different pictures) can be processed in parallel. For example, the codec may include a plurality of engines of each type. In these embodiments, each engine is replicated such that the codec may implement a plurality of pipelines 100. Further, the codec may include multiple processors for implementing duplicated instances of the software components of the pipeline (e.g., the input operation 105, the preparation operation 110, the prediction analysis 125, the transformation analysis 137, the post encoding 143, and the output operation 145). Each component may include a number N of duplicated instances (hardware or software instances) which is different from a number M of duplicated instances of another component.

The codec includes code/instructions stored on a machine-readable storage media 825 which when executed on one or more processors (e.g., processors 835) is operative to configure and control the different components of the codec for compressing and/or decompressing image data. In some embodiments, the code includes controller 845 (including the preparation code 841, a rate control 847 for providing a constant compression bit rate based on partial statistics, and the scheduler 846 for scheduling the processing of portions within the pipeline), the prediction analysis 842, the transformation analysis 843, and the post encoding 844 components which are operative to perform the following operations of the compression pipeline 100: input 105, preparation 110, prediction analysis 125, the transformation analysis 137, the post encoding operation 143, and output 145. Thus, in some embodiments, these operations are implemented as code/instructions stored on a machine-readable storage media which when executed on a processor (835) enabled the codec to perform operations described with references to FIGS. 1-7. In some embodiments, machine readable storage media 825 can be memory 850.

The codec includes one or more prediction engines 805, one or more transformation engines 810, one or more entropy encoding engines 820, and one or more processors 835, each coupled with a non-transitory machine-readable storage media 850, which is referred to herein as memory 850. In some embodiments, the memory 850 is external to the codec (e.g., memory 850 can be memory 910 of processing system 900) and it is coupled to the various components (e.g., prediction engines 805, transformation engines 810, entropy encoding engines 820, and/or processors 835) through a memory interface (not shown). In some of these embodiments, the memory interface is internal to the codec 800 while the memory 850 is external to the codec 800. In an alternative embodiment, both the memory interface and the memory 850 are external to the codec 800. In some embodiments, prediction engines 805, transformation engines 810 and entropy encoding engines 820 are operative to read and write data to memory 850 without passing through the processors 835. Alternatively, in other embodiments, the prediction engines 805, transformation engines 810 and entropy encoding engines 820 read and write data to memory 850 by passing through the processors 835, such that read and write operations are executed through the processor and transmitted to the appropriate component. In these embodiments, the different engines would not be coupled with the memory. In some embodiments, transformation engines 810 and entropy encoding engines 820 may be connected together in order to pass information directly there between. In some embodiments, each one of the transformation engines 810 may also include an in-loop filter 815.

In general, image data is stored in the memory 850 and requests are sent to the codec 800 to compress the image data. Following the receipt of the compression requests, the controller 845 configures prediction engine 805 with appropriate parameters for processing a portion of a picture from the image data stored in memory 850. In some embodiments, the prediction engine 805 is configured with configuration parameters determined at the preparation operation of the pipeline 100 according to partial compression statistics. In some of these embodiments the configuration parameters are determined in order to achieve a substantially constant bit rate compression of a stream of picture including the portion of the picture. The prediction engine 805 accesses the memory 850, processes the portion of the picture, and stores the result in the memory 850. In some embodiments, the prediction engine 805 is a hardware component operative to implement the operations of operation 115 of pipeline 100. Following its processing at one of the prediction engines 805, the portion of a picture is analyzed to gather a set of compression statistics related to the processing of a portion of a picture in the prediction engine. The set of compression statistics is then used by the controller 845 at the preparation operation 110 to determine configuration parameters for a new portion of picture. The compression statistics can be stored in memory 850 to be read by the controller 845 or transmitted directly to controller 845.

The transformation engine 810 is configured with appropriate parameters and retrieves the portion of the picture from the memory 850 in order to process it. In some embodiments, the transformation engine 810 is configured with configuration parameters determined at the preparation operation 110 of the pipeline 100 according to partial compression statistics. In some embodiments, the transformation engine 810 is a hardware component operative to implement the operations of operation 130 of pipeline 100. Further the transformation engine 810 is operative to gather a set of compression statistics related to the processing of a portion of a picture in the transformation engine. The set of compression statistics is then used by the controller 845 at the preparation operation 110 to determine configuration parameters for a new portion of picture. The compression statistics can be stored in memory 850 to be read by the controller 845 or transmitted directly to controller 845.

In some embodiments the portion of the picture processed by the transformation engine 810 is immediately transferred to the in-loop filter 815 for processing without going through the memory 850. In other embodiments the transformation engine 810 processes the portion of the picture and stores the result of the processing to memory 850 before the in-loop filter 815 accesses it. According to this embodiment, the in-loop filter 815 reads the portion of the picture from the memory 850, processes it, and stores the result in memory. In a subsequent operation data is read from memory 850 and processed by the entropy encoding engine 820. In another embodiment, the entropy encoding engine 820 receives data to process directly from the transformation engine 810. In some embodiments, the entropy encoding engine 820 is configured with configuration parameters determined at the preparation operation 110 of the pipeline 100 according to partial compression statistics. In some embodiments, the entropy encoding engine 820 is a hardware component operative to implement the operations of operation 140 of pipeline 100. Further the entropy encoding engine 820 is operative to gather a set of compression statistics related to the processing of a portion of a picture in the entropy encoding engine. The set of compression statistics is then used by the controller 845 at the preparation operation 110 to determine configuration parameters for a new portion of picture. The compression statistics can be stored in memory 850 to be read by the controller 845 or transmitted directly to controller 845.

Once the data is processed in the entropy encoding engine 820, the result of the processing is stored to memory 850 or alternatively output to an external component. The controller 845 is operative to perform the output operation 145 of pipeline 100 either by storing the compressed portion of picture in memory or outputting it to an external component.

While the codec 800 illustrates a set of components performing operations for compressing an image data, other embodiments of the codec can be used. For example, some components can be combined in a single component without departing from the scope of the present invention (e.g., each one of the transformation engines 810 can be combined with a respective one of the entropy encoding engines 820, alternatively, each one of the transformation engines 810 can be combined with a respective one of the prediction engines 805, other combinations can be performed).

Figure 9:
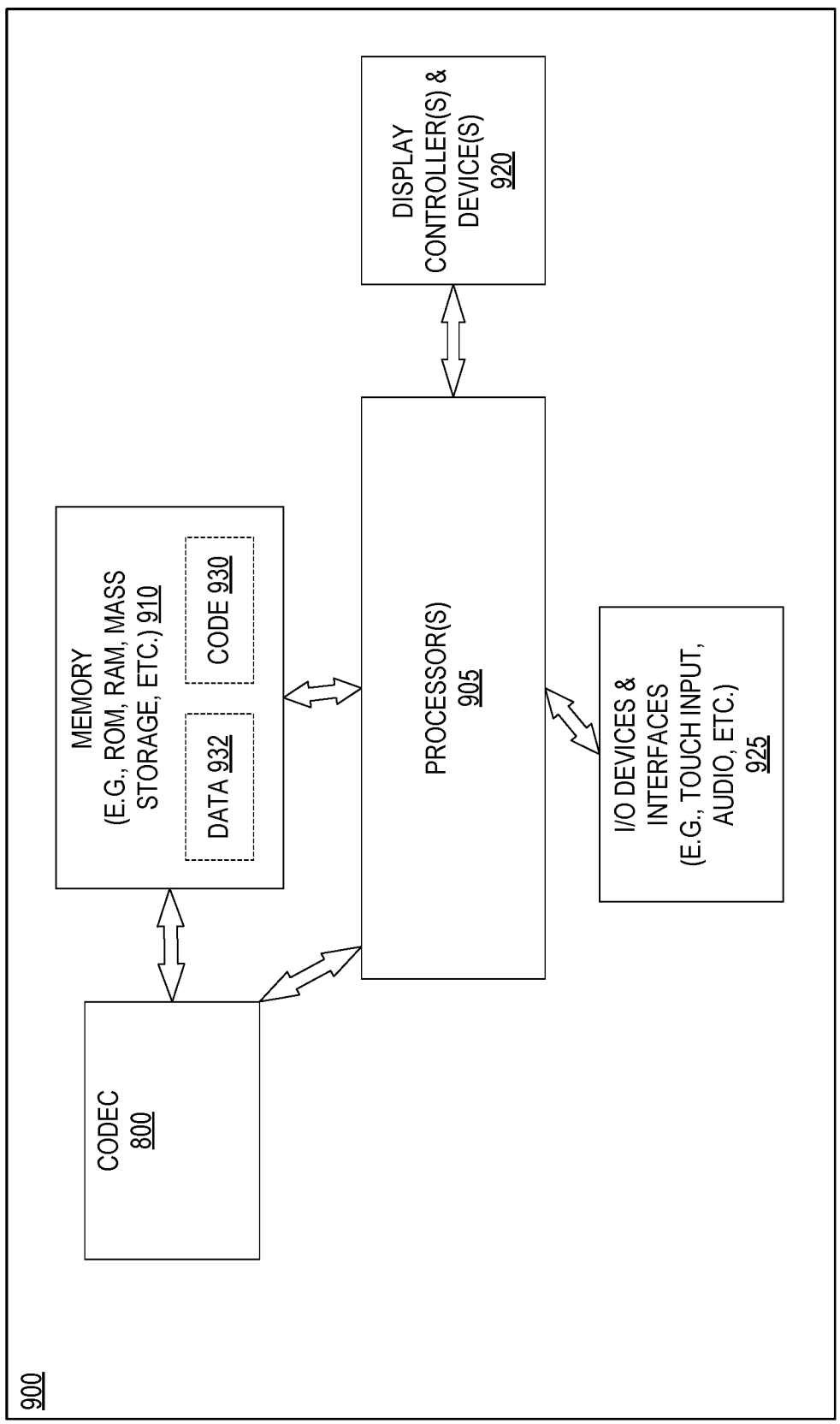
FIG. 9 illustrates a block diagram of an exemplary data processing system including a codec in accordance with some embodiments of the invention.

FIG. 9 illustrates an exemplary data processing system including a codec in accordance with some embodiments. The data processing system 900 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 910 (e.g., magnetic disks, optical disks, read only memory (ROM), flash memory devices, phase change memory, dynamic random-access memory (DRAM)) and machine-readable transmission media (also called a carrier) (e.g., electrical, optical, radio, acoustical or other form of propagated signals—such as carrier waves, infrared signals), which is coupled to the processor(s) 905. For example, the depicted machine-readable storage media 910 may store code 930 that, when executed by the processor(s) 905, causes the data processing system 900 to request compression of image data (e.g., stored as part of data 932) from the codec 800. Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 900 may further include a display controller and display device 920 which provide a visual user interface for the user, e.g., GUI elements or windows. The data processing system 900 also includes one or more input or output ("I/O") devices and interfaces 925, which allow a user to provide input to, receive output from, and otherwise transfer data to and from the system. These I/O devices 925 may include a microphone, a speaker, a mouse, keypad, keyboard, a touch panel or a multi-touch input panel, camera, frame grabber, optical scanner, network interface, modem, other known I/O devices or a combination of such I/O devices. The I/O devices and interfaces 925 may also include a connector for a dock or a connector for a USB interface, FireWire, Thunderbolt, Ethernet, etc., to connect the system 900 with another device, external component, or a network. Exemplary I/O devices and interfaces 925 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 900 with another device, external component, or a network and receive stored instructions, data, tokens, etc. It will be appreciated that one or more buses may be used to interconnect the various components shown in FIG. 9.

It will be appreciated that additional components, not shown, may also be part of the system 900, and, in certain embodiments, fewer components than that shown in FIG. 9 may also be used in a data processing system 900. For example, in some embodiments the data processing system 900 may include or be coupled with an image acquisition device.

The components of the system 900 may be packaged in various manners. For example, the one or more of the processor(s) 905 and the codec 800 may be included in a System-on-a-chip (SoC). The codec 800 may be included in a chip while the central processor(s) 905 is provided externally to the chip. The memory 910 and the codec 800 may be provided in a SoC or a chip. The codec 800 may be included in an integrated circuit or a chip and the memory 910 may be external to the integrated circuit. The codec 800, the processor(s) 905 may be coupled to the memory through a memory controller (not illustrated). The codec 800 may also be located remotely from the processor(s) 905 with the two components being part of a network.

In one embodiment, a control signal may be received by the codec 800 in order to trigger compression of image data. The control signal may be generated by an application running on a processor coupled with the codec 800 (e.g., one or more processor(s) 905 of a data processing system 900). The image data to be compressed may be stored in memory 910, to an external memory coupled with the system 900 or any other memory operatively connected to codec 800, directly or indirectly. If the image data is stored externally to the system 900, it may be copied into memory 910 before processing, by the codec 800 or by a dedicated component, such as a copy engine (not shown). The application may request that an entire stream of pictures, a portion of a stream of pictures, a picture, or a portion of a picture be compressed. In some embodiments, the request for compression may be broken down into a plurality of requests for compressing portions of the stream. The control signal may comprise control information to allow the codec to configure the various components of the codec 800 with appropriate compression parameters in order to perform the requested task(s) of compressing the image data. Configuration may be performed in one or more operations, depending on the initial request and on the format of the request. Compression parameters are initialized from configuration parameters sent by the application. The configuration parameters may be provided to the codec 800 with the request for compression or separately from the request. The codec may further use partial compression statistics of a portion of picture for determining configuration parameters for processing a portion of a portion as described with reference to FIGS. 1-7.

Some embodiments have been described with reference to two different pictures processed in parallel in a compression pipeline (e.g., pictures A and B, or pictures C and D), while partial statistics resulting from the partial compression of a first picture are used to determine configuration parameters for a second picture when compression of the first picture is not yet complete. However, the invention is not so limited, and the embodiments described herein apply to portions of a same picture being processed in parallel in the compression pipeline. For example, when a new portion of a picture is being processed at the preparation operation 110, one or more other portions may be processed at other stages of the pipelines, and some portions of the same picture may have completed being compressed in the pipeline. The codec is operative to use partial compression statistics resulting from the processing of these other portions of the same picture (which have completed compression or not yet) to determine configuration parameters at the preparation operation 110 for the new portion of that same picture.

While embodiments are described with respect to portions from pictures A, B, C and/or D being processed within the compression pipeline 100, the embodiments of the invention apply to portions of pictures of varying sizes such that portions of two or more pictures may be processed simultaneously within the same compression pipeline regardless of the number of portions or size of these portions included within each picture. For example, a picture with a different number of portions, a different size than the pictures A, B, C or D can be processed in the compression pipeline 100. Further in some embodiments, two pictures of different sizes (and or different number of portions), for example pictures A and C, can be processed in parallel in the compression pipeline 100 without departing from the scope of the current invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A non-transitory computer readable storage medium to store instructions, which when executed by one or more processors cause a compression device, wherein the compression device includes a plurality of components to be coupled in series to perform an image data compression process for compressing image data into compressed image data, and each one of the plurality of components is to perform a partial compression operation that is part of the image data compression process, to perform operations comprising:

processing a first portion of a first picture of a stream of pictures in a first component from the plurality of components of the compression device, while simultaneously processing a second portion of a second picture of the stream of pictures in a second component from the plurality of components of the compression device, wherein the processing of the first portion of the first picture is performed according to partial compression statistics associated with the second picture, and wherein the partial compression statistics result from the processing of one or more portions of the second picture in one or more of the plurality of components of the compression device when compression of the second portion of the second picture in the compression device is not yet completed.

2. The non-transitory computer readable storage medium of claim 1, wherein the operations further comprise, prior to processing the first portion of the first picture in the first component:

determining parameter values for configuring the first component for processing the first portion based on the partial compression statistics associated with the second picture.

3. The non-transitory computer readable storage medium of claim 2, wherein the parameter values enable compression of the first portion in the compression device according to a target bit rate.

4. The non-transitory computer readable storage medium of claim 2, wherein the parameter values include a quantization parameter, and wherein the processing the first portion in the first component includes performing a transformation operation according to the quantization parameter.

5. The non-transitory computer readable storage medium of claim 1, wherein the operations further comprise:

in response to determining that compression statistics resulting from the processing of a third portion of the second picture are not available, wherein the third portion of the second picture is located at a same position with respect to the second picture as a position of the first portion with respect to the first picture, waiting for compression statistics resulting from the processing of the third portion of the second picture to be available prior to processing the first portion in the first component; and in response to determining that the compression statistics resulting from the processing of the third portion of the second picture are available, wherein the third portion of the second picture is located at a same position with respect to the second picture as a position of the first portion with respect to the first picture, processing the first portion of the first picture in the first component.

6. The non-transitory computer readable storage medium of claim 5, wherein the partial compression statistics include the compression statistics resulting from the processing of the third portion of the second picture in the compression device.

7. The non-transitory computer readable storage medium of claim 1, wherein the first component is a transformation component of the compression device, and the operations further comprise:

in response to determining that a preceding portion of the first picture immediately preceding the first portion in a compression order has not completed being processed in an in-loop filtering component of the compression device, waiting prior to processing the first portion in the transformation component that the processing of the preceding portion of the first picture in the in-loop filtering component has completed; and in response to determining that the preceding portion of the first picture has completed being processed in the in-loop filtering component, processing the first portion of the first picture in the transformation component.

8. The non-transitory computer readable storage medium of claim 1, wherein the operations further comprise:
determining whether all portions of the second picture located at a predetermined distance from the first portion have completed being processed in a transformation component of the compression device;
in response to determining that at least one portion of the second picture located at a predetermined distance from the first portion has not completed being processed in the transformation component of the compression device, waiting prior to processing the first portion in a prediction component of the compression device that the processing of the at least one portion of the second picture in the transformation component has completed; and
in response to determining that all portions of the second picture located at the predetermined distance from the first portion have completed being processed in the transformation component of the compression device, processing the first portion of the first picture in the prediction component.

9. The non-transitory computer readable storage medium of claim 8, wherein the predetermined distance corresponds to a height of a search window that is to be used at a prediction component from the plurality of components for determining a prediction mode for compressing the first portion.

10. The non-transitory computer readable storage medium of claim 1, wherein the first component and the second component are operative to perform a same operation in the compression device.

11. The non-transitory computer readable storage medium of claim 1, wherein the second picture is the first picture.

12. The non-transitory computer readable storage medium of claim 1, wherein the one or more portions of the second picture include the second portion.

13. The non-transitory computer readable storage medium of claim 1, wherein the one or more portions of the second picture include a third portion of the second picture that has completed processing in the compression device.

14. The non-transitory computer readable storage medium of claim 13, wherein the partial compression statistics include an effective size of an encoded third portion that results from compression of the third portion in the compression device.

15. The non-transitory computer readable storage medium of claim 1, wherein the processing of the first portion is further performed according to compression statistics of one or more portions of a third picture that has completed processing in the compression device.

16. The non-transitory computer readable storage medium of claim 1, wherein the second picture is different from the first picture and wherein the processing of the first portion is further performed according to partial compression statistics of one or more portions of the first picture.

17. The non-transitory computer readable storage medium of claim 1, wherein the partial compression statistics include partial compression statistics gathered from a prediction analysis operation.

18. The non-transitory computer readable storage medium of claim 1, wherein the partial compression statistics include partial compression statistics gathered from a transformation analysis operation.

19. A method in a compression device, wherein the compression device includes a plurality of components to perform an image data compression process, and wherein each one of the plurality of components is to perform a partial compression operation that is part of the image data compression process, the method comprising:
prior to scheduling processing of a first portion of a first picture of a stream of pictures in a prediction component from the plurality of components, determining whether all portions of a second picture located at a predetermined distance from the first portion of the first picture have completed being processed in a transformation component from the plurality of components,
in response to determining that all the portions of the second picture located at the predetermined distance have completed being processed in the transformation component, scheduling the first portion of the first picture to be processed in the prediction component according to partial compression statistics associated with the second picture while simultaneously processing a second portion of the second picture in a component of the plurality of components; and
in response to determining that at least one portion of the second picture located at the predetermined distance has not completed being processed in the transformation component, waiting prior to scheduling the processing of the first portion in the prediction component that all the portions of the second picture located at the predetermined distance from the first portion of the first picture have completed being processed in the transformation component.

20. The method of claim 19, wherein the predetermined distance corresponds to a height of a search window that is to be used at the prediction component for determining a prediction mode for compressing the first portion.

21. The method of claim 19, wherein the second picture is the first picture.

22. The method of claim 19, wherein the partial compression statistics result from processing one or more portions of the second picture in one or more of the plurality of components of the compression device when compression of the second portion of the second picture in the compression device is not yet completed.

23. The method of claim 22, wherein the one or more portions of the second picture include the second portion.

24. The method of claim 22, wherein the one or more portions of the second picture include a third portion of the second picture that has completed processing in the compression device.

25. The method of claim 24, wherein the partial compression statistics include an effective size of an encoded third portion that results from compression of the third portion in the compression device.

26. The method of claim 19, wherein the processing of the first portion is further performed according to compression statistics of one or more portions of a third picture that has completed processing in the compression device.

27. The method of claim 19, wherein the second picture is different from the first picture and wherein the processing of the first portion is further performed according to partial compression statistics of one or more portions of the first picture.

28. The method of claim 19, wherein the partial compression statistics include partial compression statistics gathered from the prediction component.

29. The method of claim 19, wherein the partial compression statistics include partial compression statistics gathered from the transformation component.

30. A computing device comprising:
  a non-transitory computer readable storage medium to store instructions; and
  one or more processors coupled with the non-transitory computer readable storage medium to process the stored instructions to:
    prior to scheduling processing of a first portion of a first picture of a stream of pictures in a prediction component from a plurality of components of a compression device, determining whether all portions of a second picture located at a predetermined distance from the first portion of the first picture have completed being processed in a transformation component from the plurality of components,
    in response to determining that all the portions of the second picture located at the predetermined distance have completed being processed in the transformation component, scheduling the first portion of the first picture to be processed in the prediction component according to partial compression statistics associated with the second picture while simultaneously processing a second portion of the second picture in a component of the plurality of components; and
    in response to determining that at least one portion of the second picture located at the predetermined distance has not completed being processed in the transformation component, waiting prior to scheduling the processing of the first portion in the prediction component that all the portions of the second picture located at the predetermined distance from the first portion of the first picture have completed being processed in the transformation component.

31. The computing device of claim 30, wherein the predetermined distance corresponds to a height of a search window that is to be used at the prediction component for determining a prediction mode for compressing the first portion.

32. The computing device of claim 30, wherein the second picture is the first picture.

33. The computing device of claim 30, wherein the partial compression statistics result from processing one or more portions of the second picture in one or more of the plurality of components of the compression device when compression of the second portion of the second picture in the compression device is not yet completed.

34. The computing device of claim 33, wherein the one or more portions of the second picture include the second portion.

35. The computing device of claim 33, wherein the one or more portions of the second picture include a third portion of the second picture that has completed processing in the compression device.

36. The computing device of claim 35, wherein the partial compression statistics include an effective size of an encoded third portion that results from compression of the third portion in the compression device.

37. The computing device of claim 30, wherein the processing of the first portion is further performed according to compression statistics of one or more portions of a third picture that has completed processing in the compression device.

38. The computing device of claim 30, wherein the second picture is different from the first picture and wherein the processing of the first portion is further performed according to partial compression statistics of one or more portions of the first picture.

39. The computing device of claim 30, wherein the partial compression statistics include partial compression statistics gathered from the prediction component.

40. The computing device of claim 30, wherein the partial compression statistics include partial compression statistics gathered from the transformation component.

* * * * *